United States Patent
Hsiao et al.

(10) Patent No.: US 9,208,705 B2
(45) Date of Patent: Dec. 8, 2015

(54) HEAT SINK AND BACKLIGHT MODULE USING SAME

(71) Applicant: Shenzhen China Star Optoelectronics Technology Co., Ltd., Shenzhen, Guangdong (CN)

(72) Inventors: Yuchun Hsiao, Shenzhen (CN); Chong Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 143 days.

(21) Appl. No.: 13/806,806

(22) PCT Filed: Nov. 28, 2012

(86) PCT No.: PCT/CN2012/085383
§ 371 (c)(1),
(2) Date: Dec. 24, 2012

(87) PCT Pub. No.: WO2014/079081
PCT Pub. Date: May 30, 2014

(65) Prior Publication Data
US 2014/0140097 A1    May 22, 2014

(30) Foreign Application Priority Data

Nov. 21, 2012  (CN) .......................... 2012 1 0476706

(51) Int. Cl.
*F21V 7/04*    (2006.01)
*G09F 13/18*   (2006.01)
*F21V 8/00*    (2006.01)
*G02F 1/1335*  (2006.01)

(52) U.S. Cl.
CPC .............. *G09F 13/18* (2013.01); *G02B 6/0085* (2013.01); *G02F 2001/133628* (2013.01)

(58) Field of Classification Search
CPC .................... G02F 1/133615; G02F 1/133628; F21V 29/004
USPC .................................................. 362/632–634
See application file for complete search history.

(56) References Cited

U.S. PATENT DOCUMENTS

| | | | |
|---|---|---|---|
| 2007/0201232 A1* | 8/2007 | Chen | 362/294 |
| 2009/0103328 A1* | 4/2009 | Iwasaki | 362/617 |

(Continued)

FOREIGN PATENT DOCUMENTS

| | | |
|---|---|---|
| CN | 202082747 U | 12/2011 |
| CN | 102392997 A | 3/2012 |

(Continued)

*Primary Examiner* — Sean Gramling
(74) *Attorney, Agent, or Firm* — Andrew C. Cheng

(57) ABSTRACT

The present invention provides a heat sink and a backlight module using the heat sink. The heat sink includes a first bottom plate, a first side plate formed on the first bottom plate, and a second bottom plate mounted on the first bottom plate. The first bottom plate and the first side plate are integrally formed together. The second bottom plate is fixed by screws to an end of the first bottom plate that is distant from the first side plate. The first bottom plate is made of aluminum extrusion material. The second bottom plate is made of aluminum sheet material. The bottom plate of the heat sink is formed through jointing so that a portion of the bottom plate is made of aluminum sheet material that has a small thickness to thereby reduce the amount of aluminum material used and thus facilitating cost control.

11 Claims, 3 Drawing Sheets

(56) References Cited

U.S. PATENT DOCUMENTS

2010/0002418 A1   1/2010  Lin
2011/0085107 A1*  4/2011  Noh et al. .................. 349/61

FOREIGN PATENT DOCUMENTS

| CN | 102635837 A | 8/2012 |
|----|-------------|--------|
| CN | 102661550 A | 9/2012 |

* cited by examiner

HEAT SINK AND BACKLIGHT MODULE USING SAME

BACKGROUND OF THE INVENTION

1. Field of the Invention

The present invention relates to the field of liquid crystal displaying, and in particular to a heat sink and a backlight module using the heat sink.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity to the glass substrates in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlight source, such as an LED light bar, arranged at an edge of a backplane to be located rearward of one side of the liquid crystal panel. The LED light bar emits light that enters an optic film assembly through a light incident face of the optic film assembly and is projected out of a light emergence face of the optic film assembly, after being reflected and diffused, to thereby form a planar light source for the liquid crystal panel.

In the heat dissipation design of the conventional side-edge LED backlight module, an LED light bar mounted to a heat sink by being fixed by bolts or bonded by thermal grease. The heat sink is then mounted to a backplane. Heat is transmitted from the light bar to the heat sink for dissipation. As shown in FIG. 1, which is a schematic view showing the structure of a conventional heat sink for LED light bar, the heat sink 100 comprises a bottom plate 102 and a side plate 104. The bottom plate 102 and the side plate 104 are generally integrally formed of aluminum extruded material. An LED light bar 300 is mounted to the side plate 104. Heat emitting from the LED light bar 300 is transmitted through the side plate 104 to the bottom plate 102 and is dissipation through a large area of the bottom plate 102. To provide bettered heat dissipation performance, the bottom surface 102 is made of a large surface area. Generally, the width a of the bottom plate 102 is increased to expand the surface area of the bottom plate 102. However, the technical limitation of the aluminum extrusion art makes the aluminum extrusion poor in flatness if the extruded thickness is excessively small. When the width a is increased, the thickness of the bottom plate 102 must be increased correspondingly, otherwise it is difficult for the process to make an extrusion with excellent flatness. However, increasing the thickness of the bottom plate 102 will consume more aluminum extrusion material. Further, increasing the width a will require an aluminum extrusion machine of greater tonnage, and thus the cost is increased. Particularly, the increase of cost is even more significant for the heat dissipation solution for high power light bars.

SUMMARY OF THE INVENTION

An object of the present invention is to provide a heat sink, which is manufactured through a jointing manner to show excellent performance of heat dissipation and facilitate cost control.

Another object of the present invention is to provide a backlight module, which has excellent performance of heat dissipation and high quality of backlighting.

To achieve the objects, the present invention provides a heat sink, which comprises a first bottom plate, a first side plate formed on the first bottom plate, and a second bottom plate mounted on the first bottom plate. The first bottom plate and the first side plate are integrally formed together. The second bottom plate is fixed by screws to an end of the first bottom plate that is distant from the first side plate. The first bottom plate is made of aluminum extrusion material. The second bottom plate is made of aluminum sheet material.

The aluminum extrusion material that makes the first bottom plate is Al6063 and the aluminum sheet material that makes the second bottom plate is Al5052.

The first bottom plate has an outside surface that is coated with a radiation heat dissipation material. The radiation heat dissipation material comprises a thermally conductive spray coating.

The heat sink further comprises a heat conduction layer interposed between the first bottom plate and the second bottom plate.

The heat conduction layer is made of thermal paste or thermal grease.

The present invention also provides a heat sink, which comprises a first bottom plate, a first side plate formed on the first bottom plate, and a second bottom plate mounted on the first bottom plate, the first bottom plate and the first side plate being integrally formed together, the second bottom plate being fixed by screws to an end of the first bottom plate that is distant from the first side plate, the first bottom plate being made of aluminum extrusion material, the second bottom plate being made of aluminum sheet material;

wherein the aluminum extrusion material that makes the first bottom plate is Al6063 and the aluminum sheet material that makes the second bottom plate is Al5052;

wherein the first bottom plate has an outside surface that is coated with a radiation heat dissipation material, the radiation heat dissipation material comprising a thermally conductive spray coating;

further comprising a heat conduction layer interposed between the first bottom plate and the second bottom plate; and wherein the heat conduction layer is made of thermal paste or thermal grease.

The present invention further provides a backlight module, which comprises a backplane, a heat sink arranged inside the backplane, a light guide plate arranged inside the backplane, and an LED light bar mounted to the heat sink. The heat sink comprises a first bottom plate, a first side plate formed on the first bottom plate, and a second bottom plate mounted on the first bottom plate. The first bottom plate and the first side plate are integrally formed together. The second bottom plate is fixed by screws to an end of the first bottom plate that is distant from the first side plate. The first bottom plate is made of aluminum extrusion material. The second bottom plate is made of aluminum sheet material.

The aluminum extrusion material that makes the first bottom plate is Al6063 and the aluminum sheet material that makes the second bottom plate is Al5052. The first bottom plate has an outside surface that is coated with a radiation heat dissipation material. The radiation heat dissipation material comprises a thermally conductive spray coating.

The LED light bar is mounted to the first side plate of the heat sink by being fixed by screws or bonded by thermal grease.

The backplane comprises a third bottom plate and a second side plate perpendicularly connected to the third bottom plate. The first and second bottom plates are positioned on the third bottom plate. The first side plate is mounted on the second side plate.

The heat sink further comprises a heat conduction layer interposed between the first bottom plate and the second bottom plate. The heat conduction layer is made of thermal paste or thermal grease.

The efficacy of the present invention is that the present invention provides a heat sink and a backlight module using the heat sink. The heat sink has a bottom plate that is formed through jointing so that a portion of the bottom plate is made of aluminum sheet material that has a small thickness to thereby reduce the amount of aluminum material used and thus facilitating cost control. The backlight module has excellent performance of heat dissipation to thereby ensure the quality of backlighting.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
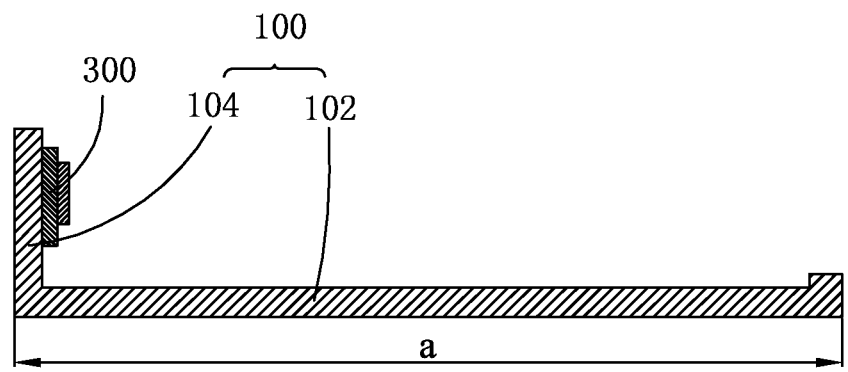
FIG. 1 is a schematic view showing the structure of a conventional heat sink coupled to an LED light bar.
Figure 2:
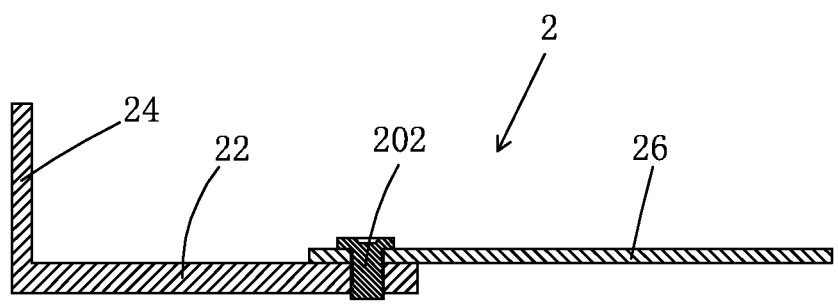
FIGS. 2 is a schematic view showing the structure of a heat sink according to an embodiment of the present invention.
Figure 3:
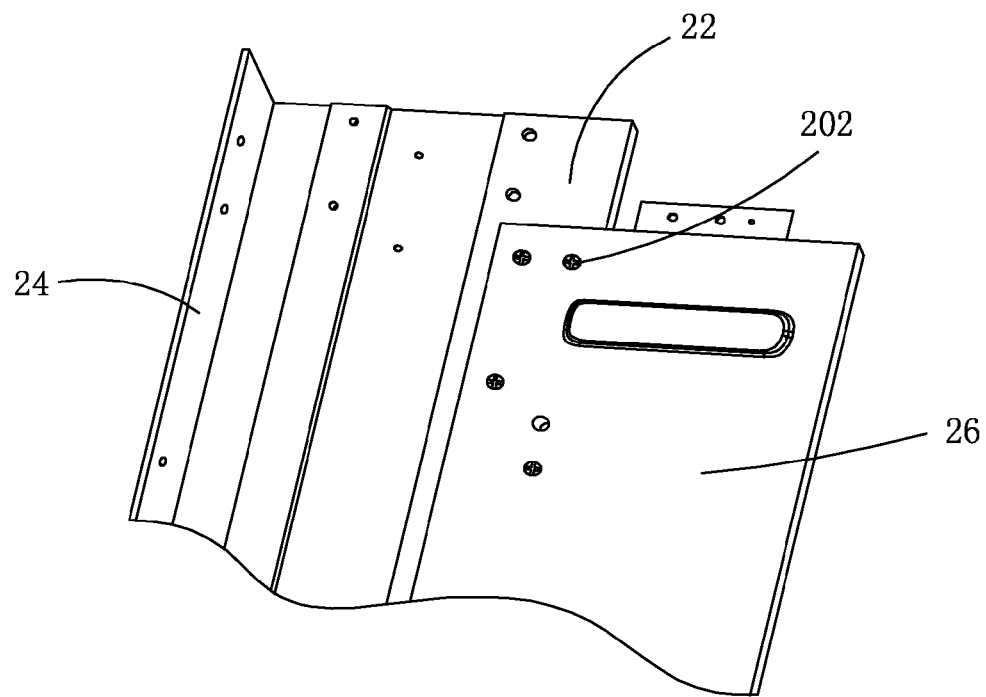
FIG. 3 is a perspective view of FIG. 2.

Referring to FIGS. 2 and 3, the present invention provides a heat sink 2, which comprises a first bottom plate 22, a first side plate 24 formed on the first bottom plate 22, and a second bottom plate 26 mounted on the first bottom plate 22. The first bottom plate 22 and the first side plate 24 are integrally formed together. The second bottom plate 26 is fixed by screws 202 to an end of the first bottom plate 22 that is distant from the first side plate 24. The first bottom plate 22 is made of aluminum extrusion material and the second bottom plate 26 is made of aluminum sheet material. Preferably, the aluminum extrusion material that makes the first bottom plate 22 is Al6063 and the aluminum sheet material that makes the second bottom plate 26 is Al5052. The first bottom plate 22 has an outside surface that is coated with a radiation heat dissipation material. In the instant embodiment, the radiation heat dissipation material is a thermally conductive spray coating in order to provide better performance of heat dissipation. The second bottom plate 26 has a relatively small thickness and, when compared to the conventional integral bottom plate, saves material and thus saves cost. The cost advantage is even more significant in high power applications.

Figure 4:
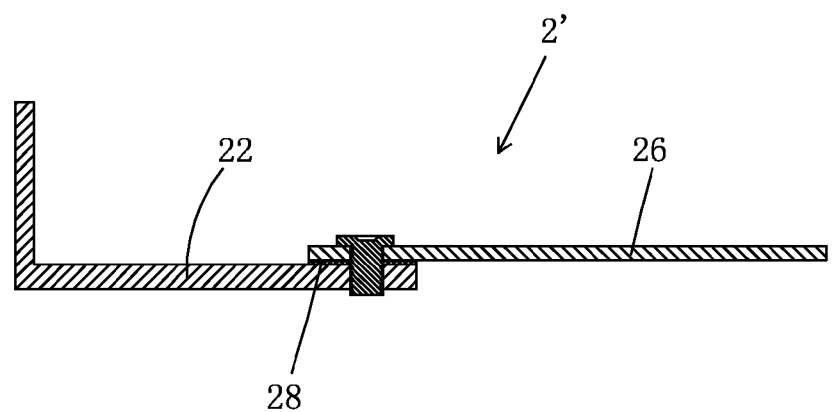
FIG. 4 is a schematic view showing the structure of a heat sink according to another embodiment of the present invention.

Referring to FIG. 4, a schematic view is given to show the structure of a heat sink according to another embodiment of the present invention. In the instant embodiment, the heat sink 2' further comprises a heat conduction layer 28 interposed between the first bottom plate 22 and the second bottom plate 26. The heat conduction layer 28 is made of thermal paste or thermal grease. The heat conduction layer 28 can effectively reduce the contact thermal resistance between the first bottom plate 22 and the second bottom plate 26 so as to improve thermal conductivity and provide the heat sink 2' with improved performance of heat dissipation.

Figure 5:
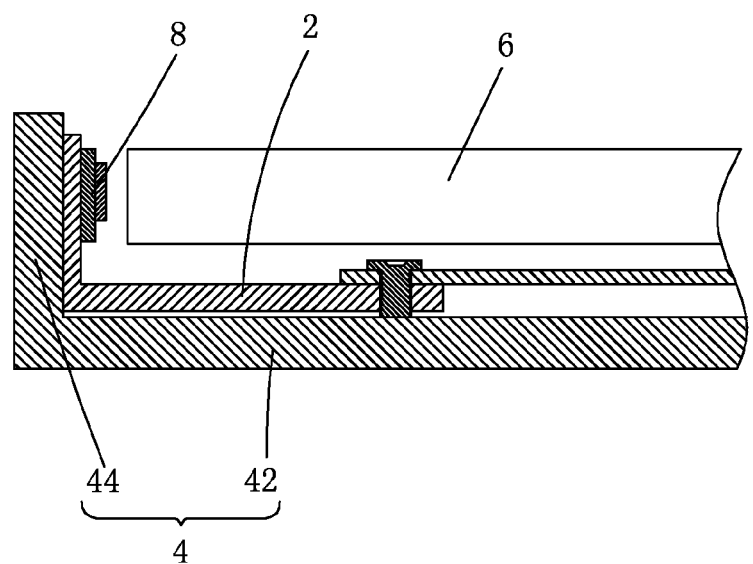
FIG. 5 is a schematic view showing the structure of a backlight module according to an embodiment of the present invention.

Referring to FIG. 5, in combination with FIGS. 2 and 3, the present invention also provides a backlight module, which comprises a backplane 4, a heat sink 2 arranged inside the backplane 4, a light guide plate 6 arranged inside the backplane 4, and an LED light bar 8 mounted to the heat sink 2.

The heat sink 2 comprises a first bottom plate 22, a first side plate 24 formed on the first bottom plate 22, and a second bottom plate 26 mounted on the first bottom plate 22. The first bottom plate 22 and the first side plate 24 are integrally formed together. The second bottom plate 26 is fixed by screws 202 to an end of the first bottom plate 22 that is distant from the first side plate 24. The first bottom plate 22 is made of aluminum extrusion material and the second bottom plate 26 is made of aluminum sheet material. Preferably, the aluminum extrusion material that makes the first bottom plate 22 is Al6063 and the aluminum sheet material that makes the second bottom plate 26 is Al5052. The first bottom plate 22 has an outside surface that is coated with a radiation heat dissipation material. In the instant embodiment, the radiation heat dissipation material is a thermally conductive spray coating in order to provide better performance of heat dissipation.

The LED light bar 8 is mounted to the first side plate 24 of the heat sink 2 by being fixed by screws or bonded by thermal grease. Heat emitting from the LED light bar 8 is transmitted through the first side plate 24 to the first bottom plate 22 and then to the second bottom plate 26 to allow the heat to be dissipated to the surrounding from the heat sink 2 and thus provide an improved performance of heat dissipation. Further, since the second bottom plate 26 is made of an aluminum sheet material that has a relatively small thickness so that the material consumed is less and the material cost can thus be reduced.

The backplane 4 comprises a third bottom plate 42 and a second side plate 44 perpendicularly connected to the third bottom plate 42. The first and second bottom plates 22, 26 are positioned on the third bottom plate 42 and the first side plate 24 is mounted on the second side plate 44.

Figure 6:
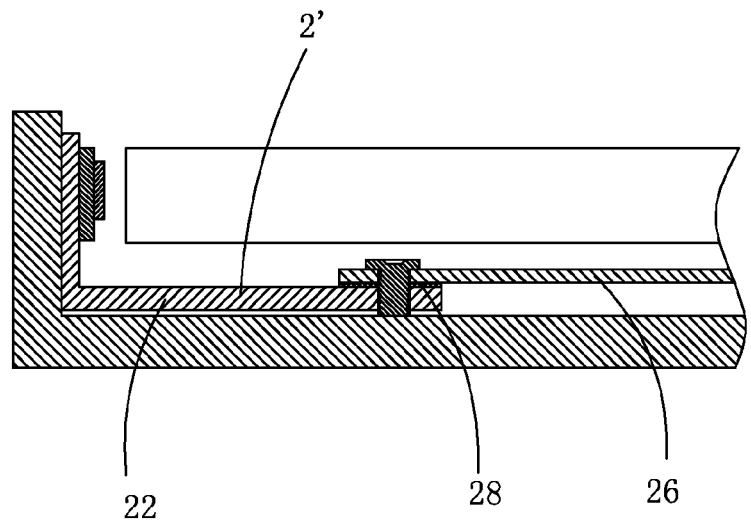
FIG. 6 is a schematic view showing the structure of a backlight module according t another embodiment of the present invention.

Referring to FIG. 6, a schematic view is given to show the structure of a backlight module according to another embodiment of the present invention. Reference is also made to FIG.

4, in the instant embodiment, the heat sink 2' further comprises a heat conduction layer 28 interposed between the first bottom plate 22 and the second bottom plate 26. The heat conduction layer 28 is made of thermal paste or thermal grease. The heat conduction layer 28 can effectively reduce the contact thermal resistance between the first bottom plate 22 and the second bottom plate 26 so as to improve thermal conductivity and provide the heat sink 2' with improved performance of heat dissipation thereby ensuring the quality of backlighting.

In summary, the present invention provides a heat sink and a backlight module using the heat sink. The heat sink has a bottom plate that is formed through jointing so that a portion of the bottom plate is made of aluminum sheet material that has a small thickness to thereby reduce the amount of aluminum material used and thus facilitating cost control. The backlight module has excellent performance of heat dissipation to thereby ensure the quality of backlighting.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A heat sink, comprising a first bottom plate, a first side plate formed on the first bottom plate, and a second bottom plate mounted on the first bottom plate, the first bottom plate and the first side plate being integrally formed together, the second bottom plate comprising a flat plate portion from which an edge portion extends flatly to be positioned on and fixed by screws to an end of the first bottom plate that is distant from the first side plate so that the second bottom plate is supported on the first bottom plate in such a way that the edge portion contacts and is shielded by the end of the first bottom plate and the flat plate portion of the second bottom plate is away from and completely outside the end of the first bottom plate for contacting air without being shielded so as to help dissipate heat therefrom to the outside, the first bottom plate being made of aluminum extrusion material and having an outside surface on which a radiation heat dissipation material that is different from the aluminum extrusion material of the first bottom plate is formed and attached thereto so as to help dissipate heat from the first bottom plate to the outside, the second bottom plate being made of aluminum sheet material.

2. The heat sink as claimed in claim 1, wherein the aluminum extrusion material that makes the first bottom plate is Al6063 and the aluminum sheet material that makes the second bottom plate is Al5052.

3. The heat sink as claimed in claim 1, wherein the radiation heat dissipation material comprises a thermally conductive spray coating.

4. The heat sink as claimed in claim 1 further comprising a heat conduction layer interposed between the first bottom plate and the second bottom plate.

5. The heat sink as claimed in claim 4, wherein the heat conduction layer is made of thermal paste or thermal grease.

6. A heat sink, comprising a first bottom plate, a first side plate formed on the first bottom plate, and a second bottom plate mounted on the first bottom plate, the first bottom plate and the first side plate being integrally formed together, the second bottom plate comprising a flat plate portion from which an edge portion extends flatly to be positioned on and fixed by screws to an end of the first bottom plate that is distant from the first side plate so that the second bottom plate is supported on the first bottom plate in such a way that the edge portion contacts and is shielded by the end of the first bottom plate and the flat plate portion of the second bottom plate is away from and completely outside the end of the first bottom plate for contacting air without being shielded so as to help dissipate heat therefrom to the outside, the first bottom plate being made of aluminum extrusion material and having an outside surface on which a radiation heat dissipation material that is different from the aluminum extrusion material of the first bottom plate is formed and attached thereto so as to help dissipate heat from the first bottom plate to the outside, the second bottom plate being made of aluminum sheet material;

wherein the aluminum extrusion material that makes the first bottom plate is Al6063 and the aluminum sheet material that makes the second bottom plate is Al5052;
wherein the radiation heat dissipation material comprises a thermally conductive spray coating;
further comprising a heat conduction layer interposed between the first bottom plate and the second bottom plate; and
wherein the heat conduction layer is made of thermal paste or thermal grease.

7. A backlight module, comprising a backplane, a heat sink arranged inside the backplane, a light guide plate arranged inside the backplane, and an LED light bar mounted to the heat sink, the heat sink comprising a first bottom plate, a first side plate formed on the first bottom plate, and a second bottom plate mounted on the first bottom plate, the first bottom plate and the first side plate being integrally formed together, the second bottom plate comprising a flat plate portion from which an edge portion extends flatly to be positioned on and fixed by screws to an end of the first bottom plate that is distant from the first side plate so that the second bottom plate is supported on the first bottom plate in such a way that the edge portion contacts and is shielded by the end of the first bottom plate and the flat plate portion of the second bottom plate is away from and completely outside the end of the first bottom plate for contacting air without being shielded so as to help dissipate heat therefrom to the outside, the first bottom plate being made of aluminum extrusion material and having an outside surface on which a radiation heat dissipation material that is different from the aluminum extrusion material of the first bottom plate is formed and attached thereto so as to help dissipate heat from the first bottom plate to the outside, the second bottom plate being made of aluminum sheet material.

8. The backlight module as claimed in claim 7, wherein the aluminum extrusion material that makes the first bottom plate is Al6063 and the aluminum sheet material that makes the second bottom plate is Al5052, the radiation heat dissipation material comprising a thermally conductive spray coating.

9. The backlight module as claimed in claim 7, wherein the LED light bar is mounted to the first side plate of the heat sink by being fixed by screws or bonded by thermal grease.

10. The backlight module as claimed in claim 7, wherein the backplane comprises a third bottom plate and a second side plate perpendicularly connected to the third bottom plate, the first and second bottom plates being positioned on the third bottom plate, the first side plate being mounted on the second side plate.

11. The backlight module as claimed in claim 7, wherein the heat sink further comprises a heat conduction layer interposed between the first bottom plate and the second bottom plate, the heat conduction layer being made of thermal paste or thermal grease.

* * * * *